(12) United States Patent
Cadle et al.

(10) Patent No.: US 7,168,858 B2
(45) Date of Patent: Jan. 30, 2007

(54) SURFACE DENSIFICATION OF POWDER METAL BEARING CAPS

(75) Inventors: Terry M. Cadle, deceased, late of Wauwatosa, WI (US); by Susan M. Cadle, legal representative, Wauwatosa, WI (US); Joel H. Mandel, Hartford, WI (US); Donald J. Phillips, Menomonee Falls, WI (US)

(73) Assignee: GKN Sinter Metals, Inc., Germantown, WI (US)

( * ) Notice: Subject to any disclaimer, the term of this patent is extended or adjusted under 35 U.S.C. 154(b) by 169 days.

(21) Appl. No.: 10/476,317

(22) PCT Filed: May 1, 2002

(86) PCT No.: PCT/US02/13487

§ 371 (c)(1),
(2), (4) Date: Jul. 20, 2004

(87) PCT Pub. No.: WO02/088556

PCT Pub. Date: Nov. 7, 2002

(65) Prior Publication Data

US 2004/0240762 A1    Dec. 2, 2004

(51) Int. Cl.
  *F16C 9/00* (2006.01)
  *F16C 33/02* (2006.01)

(52) U.S. Cl. ...................... 384/432; 384/902

(58) Field of Classification Search ............... 384/279, 384/902, 428, 429, 432, 434; 419/28, 29; 123/195 R
See application file for complete search history.

(56) References Cited

U.S. PATENT DOCUMENTS 4,394,421 A * 7/1983 Chmura et al. ............. 428/547

(Continued)

FOREIGN PATENT DOCUMENTS

EP          0 897 485          2/1999

(Continued)

OTHER PUBLICATIONS

Patent Abstracts of Japan, vol. 010, No. 172 (C-354), Jun. 18, 1986; & JP 61 023730 A (Toyota Jidosha KK), Feb. 1, 1986; abstract.

(Continued)

*Primary Examiner*—Thomas R. Hannon
(74) *Attorney, Agent, or Firm*—Quarles & Brady LLP

(57) ABSTRACT

A high performance main bearing cap has particular surfaces densified for improved fatigue crack resistance. The surfaces densified are the bolted face (F) inside of a perimetral margin and outside of bold head interface areas around the main bolt holes (B), the surfaces of the main bolt holes and the side bolt hole threads (S). Preferred methods of densification are single needle programmable pattern peening of the bolted face peened area, over-burnishing of the bolt holes, and forming the threads rather than cutting them for the side bolt threads.

13 Claims, 10 Drawing Sheets

U.S. PATENT DOCUMENTS

| | | | |
|---|---|---|---|
| 5,501,529 A * | 3/1996 | Cadle et al. | 384/432 |
| 5,915,762 A | 6/1999 | Wakabayashi et al. | 29/888.09 |
| 6,013,225 A * | 1/2000 | Cadle et al. | 419/29 |
| 6,017,489 A * | 1/2000 | Woolf et al. | 419/28 |
| 6,086,258 A * | 7/2000 | Cadle et al. | 384/294 |
| 6,171,546 B1 * | 1/2001 | Mars et al. | 419/38 |

FOREIGN PATENT DOCUMENTS

| | | |
|---|---|---|
| FR | 2 201 942 | 5/1974 |
| GB | 2 180 905 | 4/1987 |
| WO | WO 00/46520 | 8/2000 |

OTHER PUBLICATIONS

International Search Report, Form PCT/ISA/210, as issued by European Patent Office in Connection with PCT Application No. PCT/US02/13487.

* cited by examiner

SURFACE DENSIFICATION OF POWDER METAL BEARING CAPS

FIELD OF THE INVENTION

This invention relates to performance enhancements to powder metal parts by surface densification, and in particular, to powder metal bearing caps.

BACKGROUND OF THE INVENTION

The use of powder metallurgy (P/M) to produce steel main bearing caps for passenger vehicle engines has grown from zero to well over 70 million components in service. The material being replaced is cast iron, usually of the type commonly known as "Ductile Cast Iron" (DCI). There are many commercial and technical advantages to using the P/M process, including elimination of many costly machining steps, forming of unique shapes and geometries during the molding (powder compaction) stage, and material versatility. The large majority of engines used in automotive vehicles fall in a power density ratio (power to engine-size ratio) that places stresses on the main bearing caps that can be accommodated by the P/M steel's inherent material strength. However, there are some special purpose high performance engines that are used for special road cars including racing that go beyond the normal power density ratios. In these special cases, the main bearing cap's performance safety factor is reduced from the preferred minimum of 1.5 to a level approaching 1.0. The 1.0 safety factor means that the component would only just survive the maximum rated engine performance in the long term.

In such cases, it is appropriate to enhance the performance (strength under cyclic fatigue conditions) of the main bearing cap to provide a comfortable safety margin.

The P/M steel materials used for main bearing caps can be strengthened by conventional means such as heat-treating of the material (quench-hardening). In this case, the material is inevitably much harder, and is therefore resistant to the machining operations that are required after the component is installed in the engine cylinder block.

A virtually unique property of metals processed by powder metallurgy is the capability to vary the density, which is the mass per unit volume of the material. This property naturally develops during the P/M manufacturing process that is well known to those versed in the art. Briefly, this consists of compacting the selected powder mix, under high pressure, in specifically designed tooling, into a shape known as a "pre-form", which is then thermally treated by a process known as "sintering", which causes the powder particles to fuse together, thereby developing mechanical strength.

It is also well known to those versed in the art that the physical and mechanical properties of the P/M metal increase as the density of the metal increases.

Therefore, to increase the strength of a P/M steel main bearing cap without prejudicing the ease of machining (machinability), it is appropriate to raise the density of the compact. This can normally be achieved by raising the powder compaction pressure, but this option is limited by the strength of the compaction tooling. Alternatively, the design can be simplified to enable more robust tooling to be designed that can withstand higher compaction pressure, but this invariably leads to additional costly machining operations, which may render the product non-viable commercially.

A special feature of metals that are at less than full density is the ability to locally densify the surface by application of mechanical pressure. This can be achieved in several ways, for example by rolling a hard roller over the surface (burnishing), or by localized hammering (peening). Such local densification processes are known to those versed in the art. These processes, when correctly applied, may also result in favorable "residual compressive surface stresses" that can extend the operational life of the product under cyclic fatigue conditions.

This invention teaches a method of incorporating these principles in a new way to enhance the performance of powder metal mechanical components, and in particular, a powder metal steel main bearing cap to meet the demands of modern high performance car engines.

There are three principal mechanical failure modes associated with high performance engine main bearing caps, namely fatigue cracking through the bolted face (FIG. 1a), fatigue cracking through the inner bolt hole (FIG. 1b), and side bolt-hole thread failure (FIG. 1c).

A research program was initiated at the inventor's company to determine if and how the strength of the main bearing cap could be raised by application of surface densification to each of these critical areas. This required extensive processing development work, plus many long term fatigue tests on both test pieces and on actual main bearing caps that are in current production.

SUMMARY OF THE INVENTION

In one aspect, the invention provides a high performance bearing cap construction which addresses the main failure modes of a main bearing cap and a method of making the construction. The invention surface densities certain areas of the bearing cap to increase its strength and resistance to failure.

In particular, one aspect of the invention is to surface densify the bolted surface of the main bearing cap. It is preferred to perform this densification on the bolted surface of the cap inward of each main bolt hole but not at the areas which are under the heads of the bolts, and not to densify the surface immediately adjacent to the edges of the bolted surface, so a small undensified margin is left at the edges. The bolt head interface area is not densified to preserve its surface finish for consistent tightening friction and bolt stretching when the bolts are tightened, and the margin areas are not densified so as not to create any sharp edges or burrs at the edges.

The densification of the bolted surface is preferably performed by needle peening, and specifically by a precision pattern peening process, using a precision programmable single needle peening machine. The single needle peening machine is of the type normally used for stamping numbers into parts, sometimes called a pin stamper. It peens with a single needle in a matrix pattern, the specific shape of which is programmable. Therefore, it can be programmed to surface densify specific areas in a powder metal component. In the case of a main bearing cap, it is programmed to densify an area inside of margins adjacent to the edges of the bearing cap and on the inner side of the bolt head interface area around each inner bolt hole, which is the interface between the head of the bolt and the bearing cap. The densified area extends inwardly for a length which is sufficient to cover the most likely area of fatigue crack propagation.

In another aspect of the invention, the bolt holes (which extend through the bolted surface) are mechanically expanded to an extent so as to densify the bolt hole surface to a significant depth. The densification depth is sufficient to strengthen the bearing cap in the area of the bolt hole and increase its resistance to developing a fatigue fracture that starts at the bolt hole. Preferably, the densification is performed for the full length of the bolt hole, but should at least cover the length which is about a third of the way up from the bottom end of the bolt hole (the bottom end of the bolt hole is at the surface of the bearing cap which interfaces with the crankcase and that the bolt goes through).

In another aspect of the invention, the bearing cap is improved by forming, rather than cutting, the threads in the side bolt holes of the bearing cap, if side bolt holes are provided. Forming the threads, by roll forming for example, densifies the thread surface to a depth that resists stripping or shearing of the threads, or pulling out of the side bolt.

In an especially useful aspect of the invention, a combination of two or more of the identified areas are surface densified. If only one area is surface densified, then that may only make it more likely that the failure will occur in one of the other areas. Preferably, at least the bolted face and the bolt holes are surface densified. If all three areas are surface densified, the three main failure modes are addressed, resulting in a very high performance bearing cap.

In another aspect, the invention provides a method of surface densification of powder metal components within specific areas of a surface by mechanically indenting the area to density the surface of the area by applying a geometrical pattern of overlapping spherical indentations within the area. This method results in a specific area of surface densification, without adversely affecting other areas of the component.

These and other objects and advantages of the invention will be apparent from the detailed description and drawings.

DETAILED DESCRIPTION OF THE PREFERRED EMBODIMENT

Figure 1A:
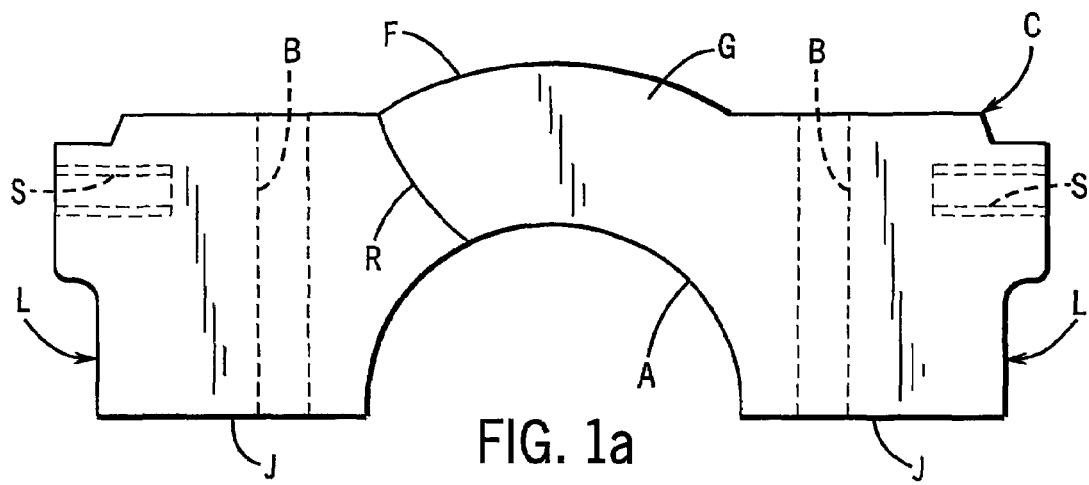
FIG. 1a is a side plan view illustrating a fracture R which has propagated through the bolted face F of a main bearing cap.
Figure 1B:
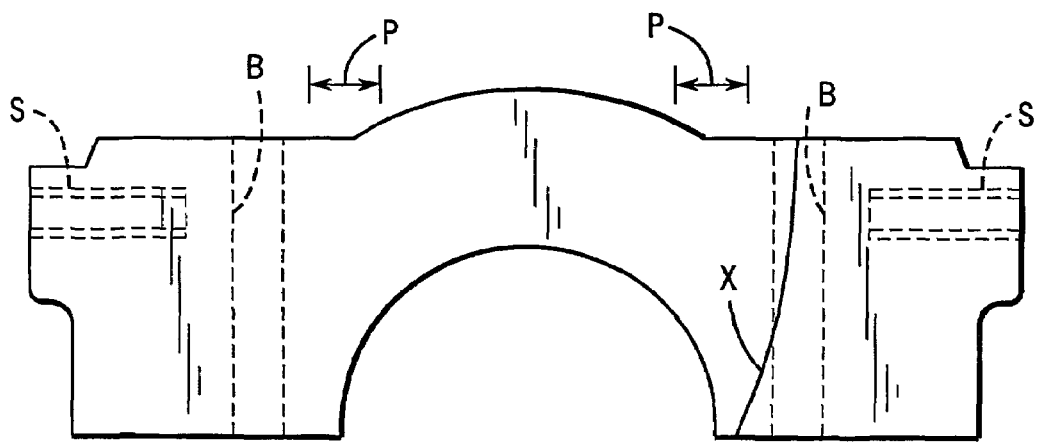
FIG. 1b is similar to FIG. 1a, but illustrating the main bolt holes B and the side bolt holes S in hidden lines and showing a fracture which has propagated from the inner side of one of the main bolt holes B.

Referring to FIGS. 1a and 1b, a powder metal bearing cap C has a bore arch A in a bridging section G between two legs L of the bearing cap C, with main bolt holes B extending through the legs L from a bolted face F which is opposite from the bore arch A to a joint face J of each leg L. The joint face J is opposite from the bolted face F, with one joint face on each side of the arch. As is well known, the cap C is bolted to a crankcase so that the arch A, together with a similar arch in the crankcase, defines the bore in which the crankshaft of the engine is journalled.

The present invention provides improvements to the fatigue crack resistance of powder metal components, in particular in the preferred embodiment to a main bearing cap, by surface densifying certain surfaces which are susceptible to failure by fatigue cracking. In the main bearing cap, there are three such surfaces, as stated above: the bolted surface F; the main bolt hole surfaces B; and the side bolt thread surfaces S. Each is discussed below.

Localized Surface Densification of the Bolted Surface

Figure 2:
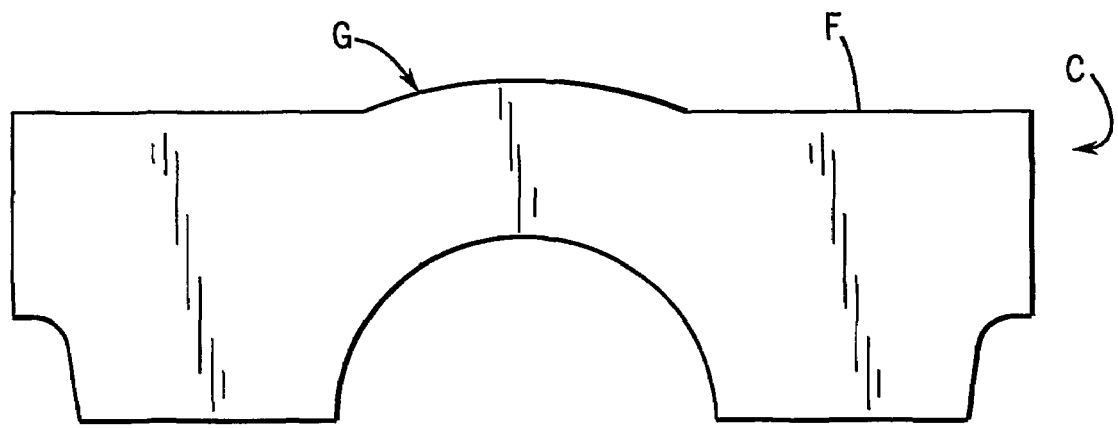
FIG. 2 is a side plan view of a main bearing cap of a type having an arch or hump in the bolted surface F.
Figure 3:
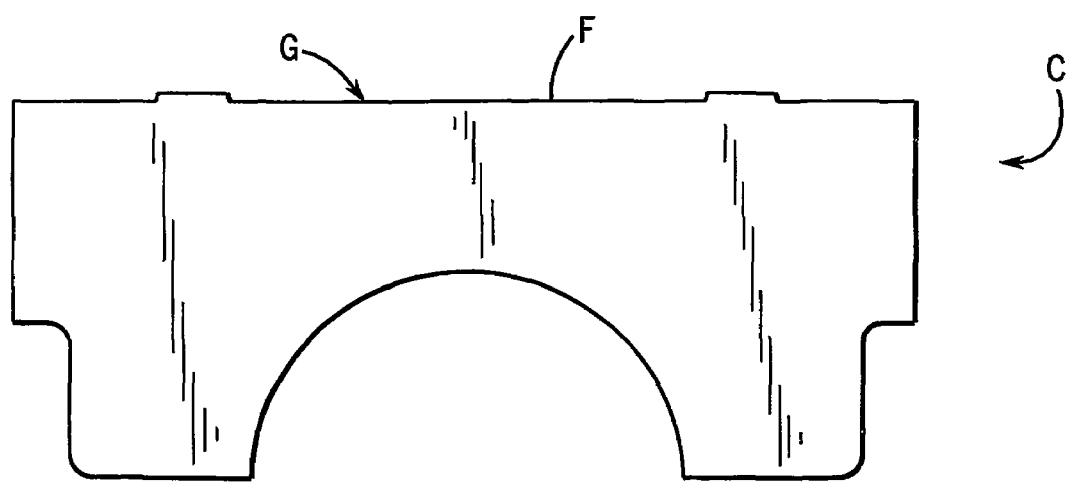
FIG. 3 is a side plan view of a main bearing cap of a type having a generally flat bolted surface F (there may be raised or unraised lands around the bolt holes in either type of bearing cap)

The bolted surface F of a main bearing cap C may be flat or feature an arch (compare FIGS. 2 and 3) in the bridging region G which is between the two legs L. In both cases, the maximum critical stress in service is a tensile cyclic stress (fatigue stress) in the bridging region between the inner main bolt-holes B (note that one, two or more main bolt holes may be provided in each leg L with one "inner" hole closest to the arch A and the others further outward). A typical crack R developed in this mode of failure is shown in FIG. 1a. For this development work, a combination of using strain gages on actual caps under simulated service conditions and finite element analysis (FEA) was used to determine the location of the maximum tensile cyclical stress. A similar procedure was employed upon the fatigue test coupons that were used to determine basic material property enhancement in fatigue test units used in the program.

Shot Peening and Needle Peening to Improve Component Fatigue Life

Shot peening is in general known as a method of improving fatigue strength. Shot peening involves firing hard shot (small particles) against the surface to be strengthened. This process however is costly and dusty, requiring extraordinary precautions to prevent localized air contamination that is potentially harmful and certainly unpleasant to operators.

Another drawback to shot peening is that it is indiscriminate and covers all surfaces exposed to the shot stream. In some cases a shot peened surface condition is undesirable, since peening roughens the surface. This can adversely alter the friction coefficient of the surface, and may also detract from the product's cosmetic appearance. To be selective, the areas that would be damaged by the shot peening action must be shielded or individually masked and then unmasked. This is a very costly procedure.

Needle peening is a less well-known alternative and is a process employing hard steel needles that are caused to hammer (peen) the surface of the metal. This is a more environmentally friendly process that is also lower cost.

The needle peening process is far more localized than shot peening and can be aimed at the specific area of a component that must be strengthened. This process was assessed on the critical regions of main bearing caps. The equipment used was a commercially available descaling gun. This is usually employed in removing scale from welded joints—to permit painting, improve appearance and to reveal the quality of the weld. The needles are typically 6–8 inches long and about 0.125 inches diameter. The tips of the needles commonly used for descaling were found to be unsuitable for the needle-peening process. Experimentation showed that after a prolonged period (several hours) the original square chamfered tips of the needles assumed a natural spherical radius that was thereafter quite stable. Therefore an important part of the invention is to pre-determine this "natural radius" and to machine the needle tips to this form before starting to use them in service. Failure to do this leads to uneven and sharp needle indentations in the early parts processed. Sharp edged indentations would not improve fatigue life of the component, and may even reduce component service life by providing stress raisers.

Figure 4:
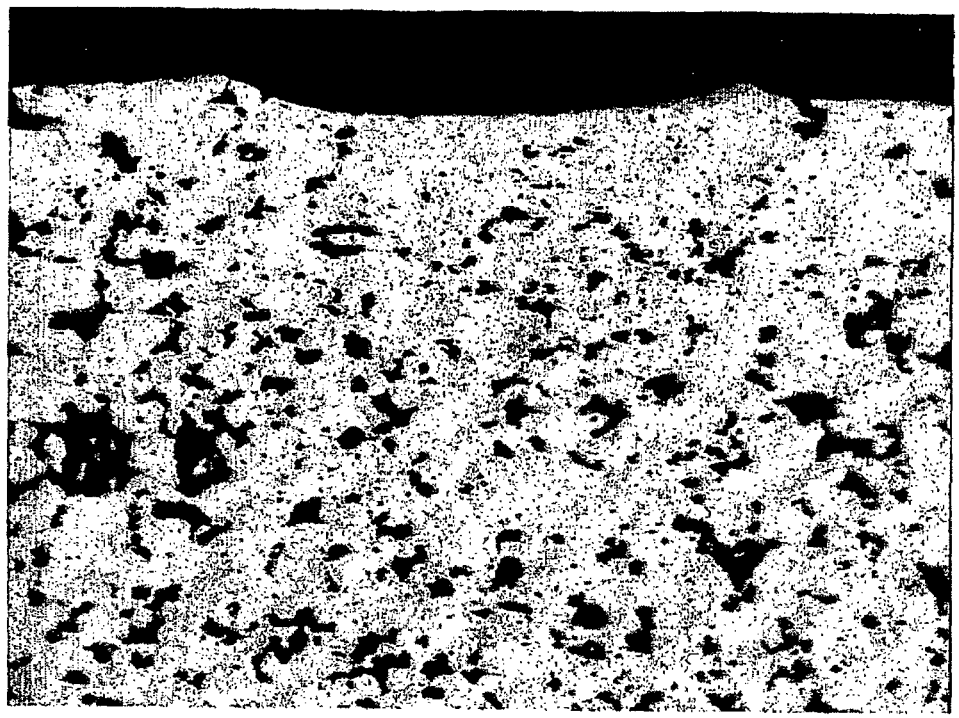
FIG. 4 is a cross-sectional photo-micrograph of a needle peened area of the surface of a powder metal part.
Figure 5:
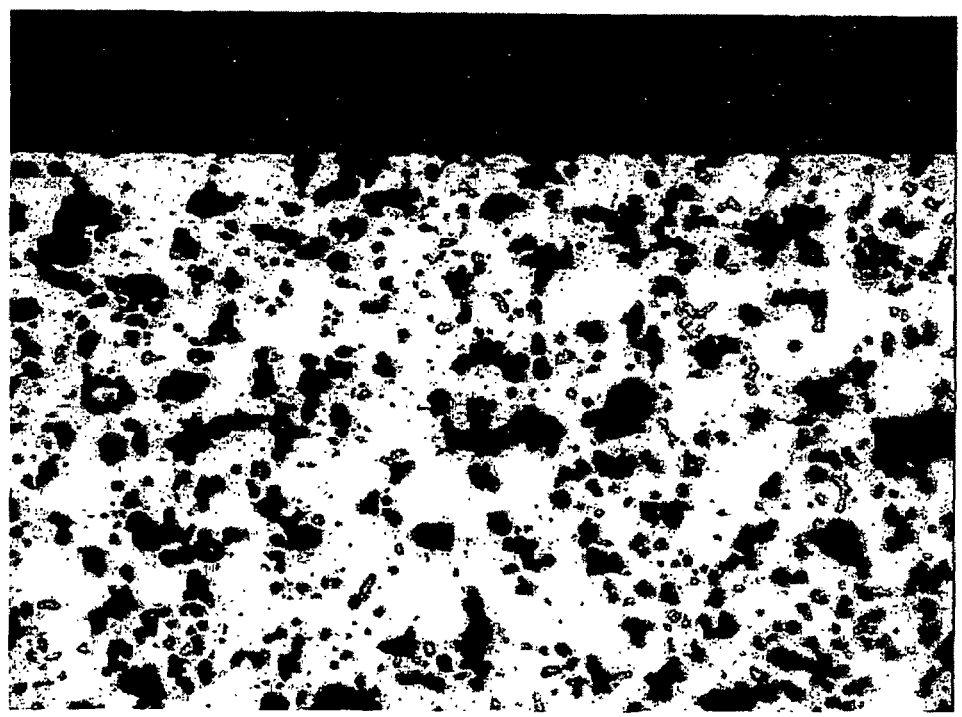
FIG. 5 is like FIG. 4, but of an unpeened surface.

The results of the needle peening trials are shown in the photo-micrograph of a cross section of a treated surface (FIG. 4) This illustrates the local surface densification produced by the radiused impacting needles. In contrast, FIG. 5 shows the undensified surface.

Assessment of the shot peening and the localized air gun needle peening processes and their respective effect on fatigue life was carried out in two stages. The first stage used six fatigue life testing machines. Test coupons (samples) were prepared and were split into three groups: untreated, shot peened and needle-peened. Then fatigue testing was carried out on all three sets of test coupons. Both the shot peened and airgun needle peened coupons yielded an increase in fatigue life of at least 15% over the untreated coupons. The exact improvements achieved depended on process parameters selected. These include intensity of shot or needle impact, time of treatment, and diameter of shot or needle tip. These parameters should be optimized for the specific material being processed.

While the air gun needle peening process was very effective on the coupons and would be equally effective on many P/M mechanical components, it was found that there were two drawbacks to the airgun needle peening when applied to the main bearing cap. Each needle is guided in the airgun barrel by guide holes, but the holes must allow freedom for the needle to both rotate and also to produce a random pattern of overlapping indentations in order to avoid repeated hammering in one spot. It is well known that the overlapping of indentations is essential to produce the increase in fatigue life. This occurs naturally in shot-peening due to the random impact of the shot. With airgun needle-peening, each needle covers a circle of indentations at least 5 times the needle diameter, and this limits the application of the process in terms of precision of the perimeter of the treated surface.

Figure 6A:
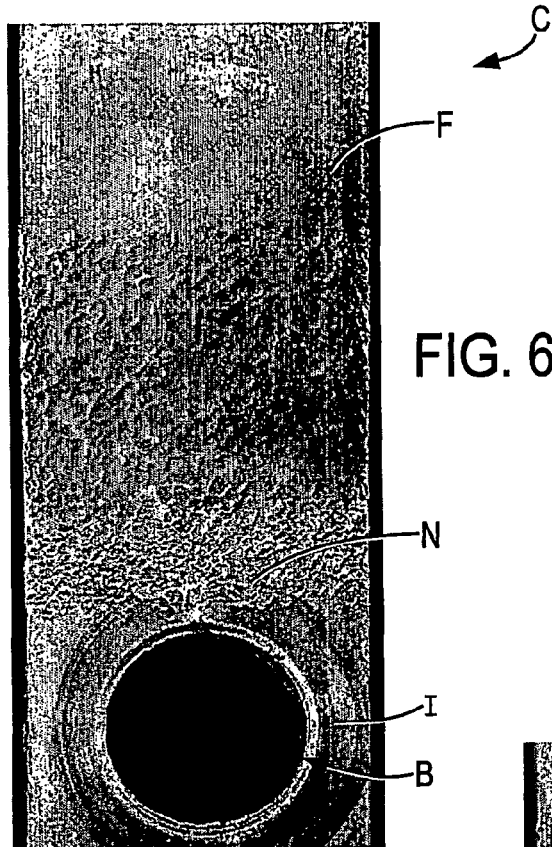
FIG. 6a is a view of needle peening overlapping onto a bolt head interface surface of a bearing cap.

The first example (FIG. 6a) shows how the dispersion of needle indentations N extends onto the bolt head interface surface I that is clamped against the main bolt captive-washer. There is a strict surface finish specification for this area I in order to control friction between the bolt head and main bearing cap interfacing surfaces during application of the specified bolt torque parameters. This is critical to achieving a consistent bolt-down load and bolt tension on the engine cylinder-block line at the engine maker's plant. This level of indentation dispersion can be reduced by individual component shielding but that involves extra cost and complexity.

Figure 7:
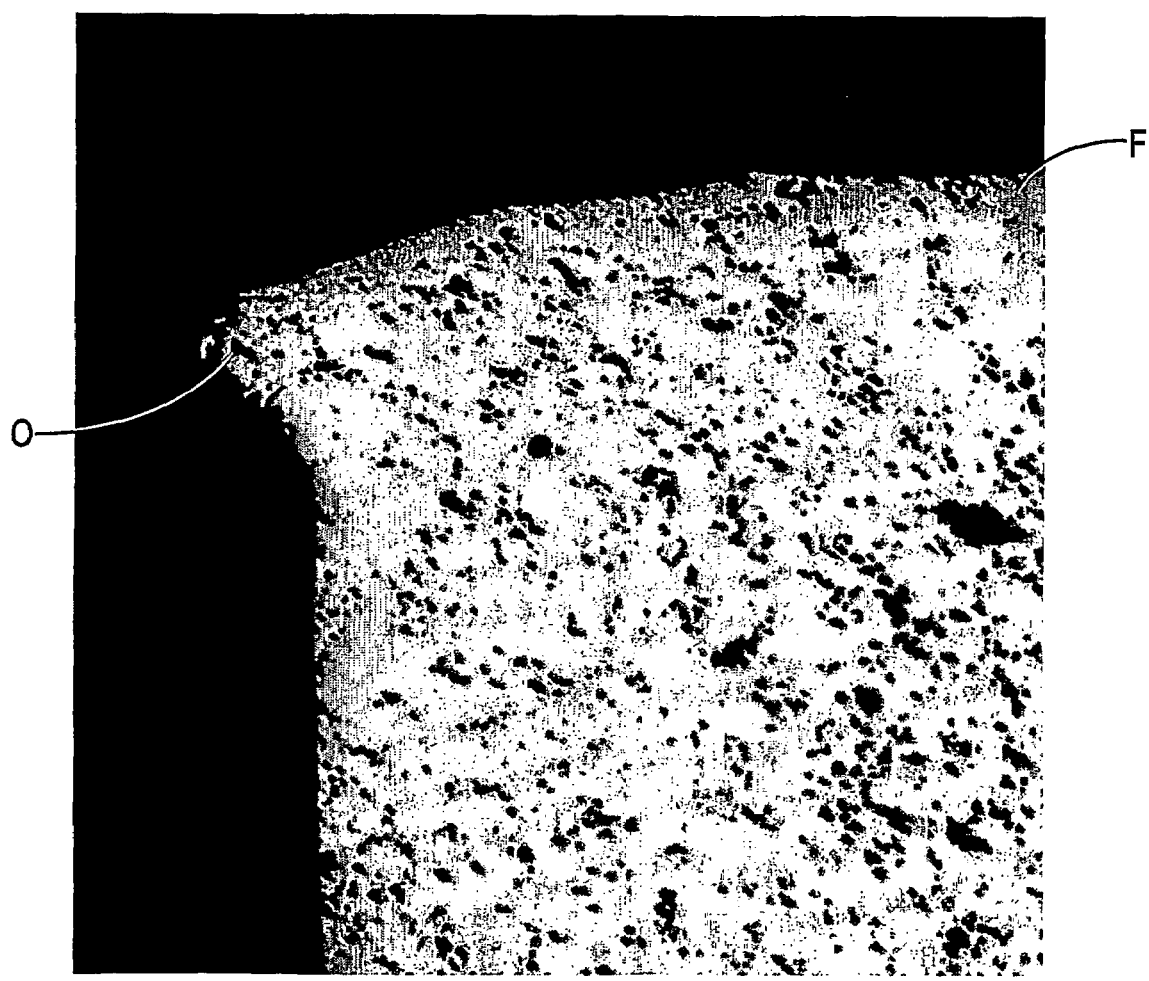
FIG. 7 is a cross-sectional photo-micrograph showing a burr formed at the edge of a conventionally needle peened surface.

The second drawback is shown in FIG. 7, where the needle tips hit at the edge of the main bearing cap surface and swage the metal into a very sharp overhanging lip 0. This is unacceptable for safe product handling, and requires component shielding during peening or additional processing to remove the sharp burr.

The Precision Pattern Peening (3P) Process

In an effort to overcome the drawbacks described above, an alternative process with improved indentation-pattern precision was needed. A process was developed that achieved these goals and is called the "3P" process which stands for Precision Pattern Peening. The process involves use of a programmable-pattern single needle indenting machine. The machine used for development is employed, in its standard form, for inscribing identification characters on metal surfaces. Such a machine is commercially available, for example, from Telesis Technologies, Inc. of Circleville, Ohio. By increasing the power of the machine and by fitting a special holder and a precisely machined tungsten carbide indenter, it proved possible to produce precisely controlled overlapping indentation patterns within a precise perimeter. This approach solved all the outstanding problems associated with both shot peening and airgun needle peening.

Figure 6B:
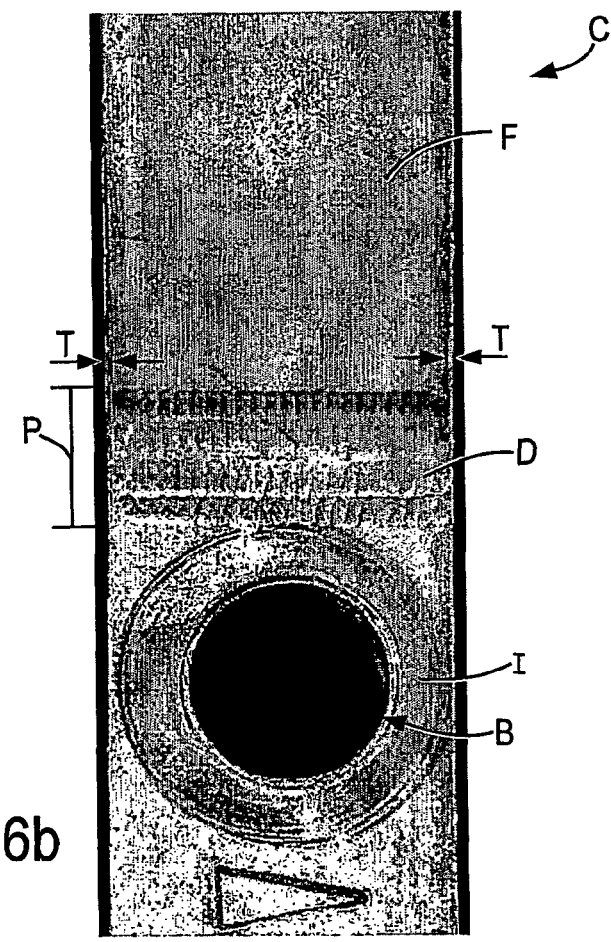
FIG. 6b is a view of a pattern peened surface illustrating single pin patterned peening tangent to the bolt head interface surface, without overlapping thereon.

FIG. 6b shows the distinctive geometrical indentation pattern D from the 3P process. This pattern is very distinctive, and in stark contrast to the random pattern produced by previously known peening processes. This contrast is shown by comparing FIGS. 6a and 6b. As shown in FIG. 6b, the 3P process precisely limits the boundary of the peened area to avoid the bolt head region I and also leaves a small unpeened margin T adjacent to each side edge of the bearing cap C, which avoids generation of the sharp edge burr associated with the conventional peening processes. The length P of each densified area D on the bolted face F of the pattern peened cap C is shown in FIGS. 1b and 6b, illustrating that the densified area D covers the two areas of the bolted face F from which fatigue cracks involving the bolted face are most likely to propagate. The pattern peener peened this area to a depth of approximately 0.0635 mm (measured from the surface of an unpeened area to the surface of a peened area). It is noted that two single needle pattern peeners could be used to densify a single bearing cap, one peener working on the right area D and the other working on the left area D, to reduce cycle time.

The effectiveness of the 3P process to extend fatigue life was assessed by going directly to fatigue testing of main bearing caps on fatigue testing machines. By adjusting the pattern laid down by the 3P process to provide controlled overlapping and density of indentations (which may be varied, depending on the material being peened), the fatigue life of the main bearing cap was increased by at least 15%. Remarkably, the time cycle to produce an acceptable pattern over the targeted area was actually faster than both of the other traditional processes.

An additional benefit of the 3P process is the quality control aspect in large scale production. The automated setup is far more consistent than either shot or air-gun needle peening. The only uncontrolled variable is the wear rate of the single carbide indenter. By measuring the change in profile of the single indenter using a standard profile comparator, the indenter life can be predicted and the indenter changed under preventive maintenance procedures.

It is important to note that the powder metal material used for this research has a ductility of 3% tensile elongation. This invention may be less effective on brittle materials since they will be prone to micro-cracking.

Local Densification of the Bolt Hole by Hole Surface Densification

Careful examination of deliberately failed main bearing caps (from over-stressing) determined that a fatigue crack initiated on the inside of the inner bolt hole B at about a third of the height from the joint face J at the thinnest wall section. A typical crack X developed in this mode of failure is shown in FIG. 1b.

A well-known method of improving the surface finish of a hole in a traditional metal component is to "burnish" the inner surface with a burnishing tool. The tool consists of hard pins that act as rollers that smooth the surface, removing rough areas and improving hole roundness. Typical burnishing of P/M holes results in expansion of the diameter of the hole by 0.025 to 0.050 mm. In this invention, burnishing tools are applied to expand the hole to a much greater extent, beyond the conventional smoothing action, to effect substantial surface compression, which results in surface densification. Experimentation on holes in P/M steel has shown that the limiting degree of surface densification depends upon the material ductility and starting density, but the limit corresponds to the point where surface integrity breaks down and circular cracks, sometimes called orange-peeling, begin to form. Thus, in practicing the invention, the bolt hole surfaces are compressed significantly more than would normally be done in burnishing to smooth the surface, remove rough areas and improve hole roundness; enough to compress the hole surface so as to densify it, but less than the amount that results in cracking of the surface.

To evaluate the efficiency of this technique, a powder metal bearing cap was selected, and the most highly stressed main bolt-holes were progressively burnished to increasing degrees.

Figure 8:
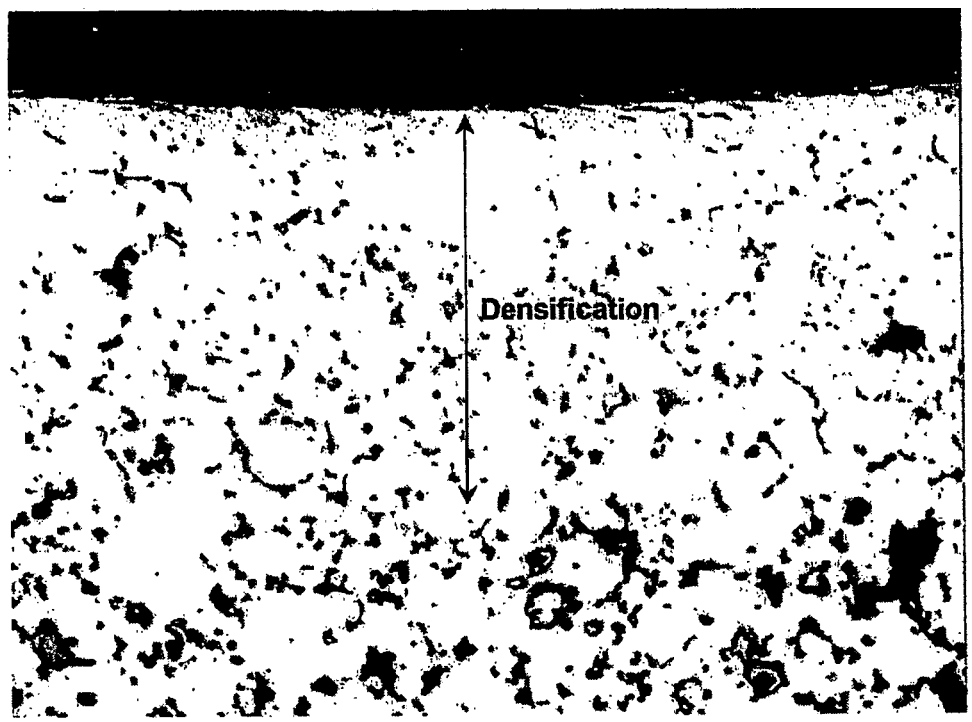
FIG. 8 is a cross-sectional photo-micrograph of the inside of the bolt hole B after burnishing.
Figure 9:
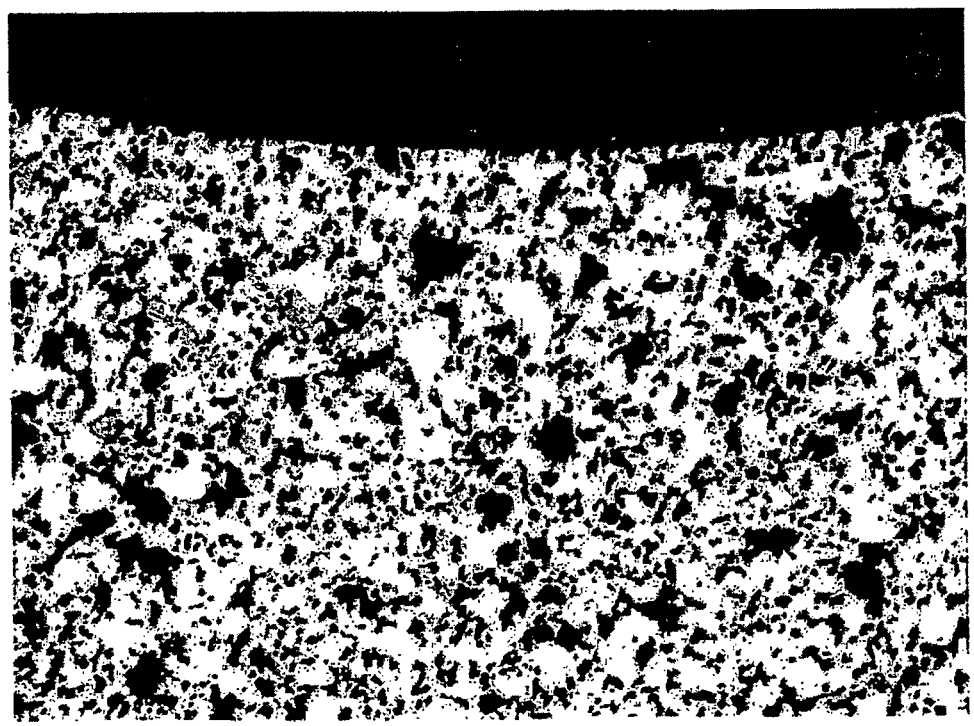
FIG. 9 is like FIG. 6 but showing the bolt hole B before burnishing.

It was found that applying the "normal" degree of surface burnishing, as recommended in technical publications, did not cause surface densification. However, by "over-burnishing" to well beyond the recommended level, significant densification occurred. This is shown in FIG. 8, which is a cross section through a bolt hole B over-burnished by 0.15 mm on diameter (from a diameter of approximately 10.85 mm to a diameter of 11.00 mm). FIG. 9 shows the density without over-burnishing. While this amount of hole surface densification achieves near maximum advantage, as little diameter expansion as 0.10 mm would achieve significant advantage from the invention. Therefore, the invention contemplates hole wall expansion of from 0.10 mm to the limit at which surface cracking starts to form to densify the hole surfaces.

Figure 10:
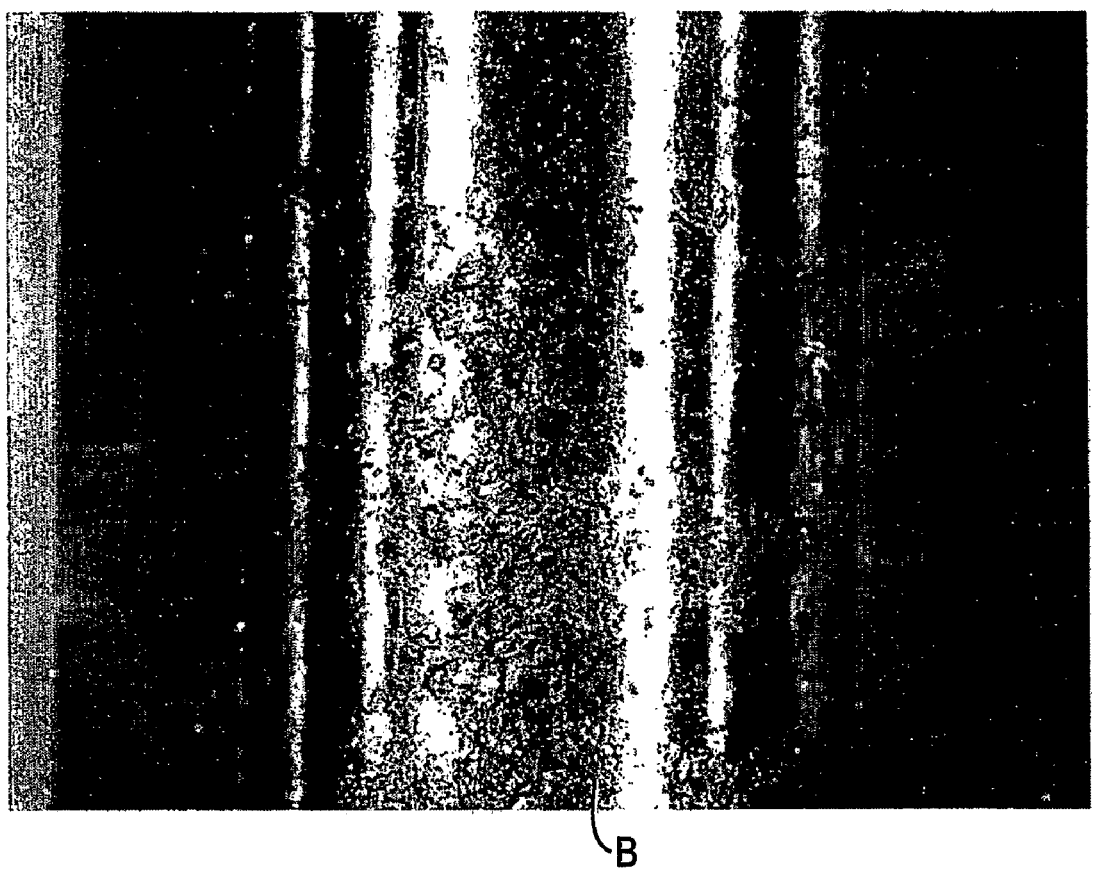
FIG. 10 is a photographic photocopy showing an orange peel effect on the surface of the bolt hole B resulting from excessive burnishing of the bolt hole.
Figure 11:
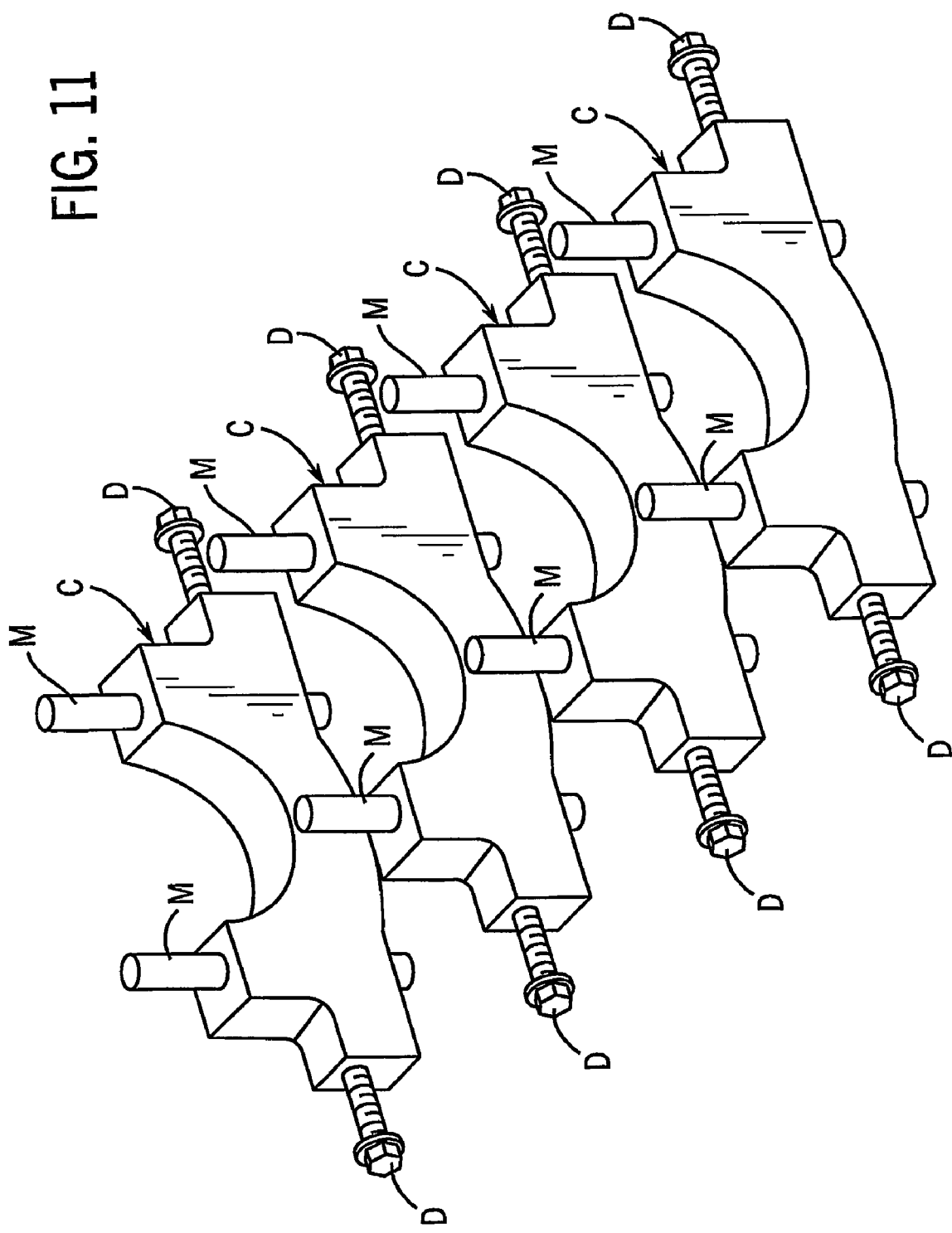
FIG. 11 is a perspective view of side bolted bearing caps C, each shown with two side bolts D and two main bolts M.
Figure 12:
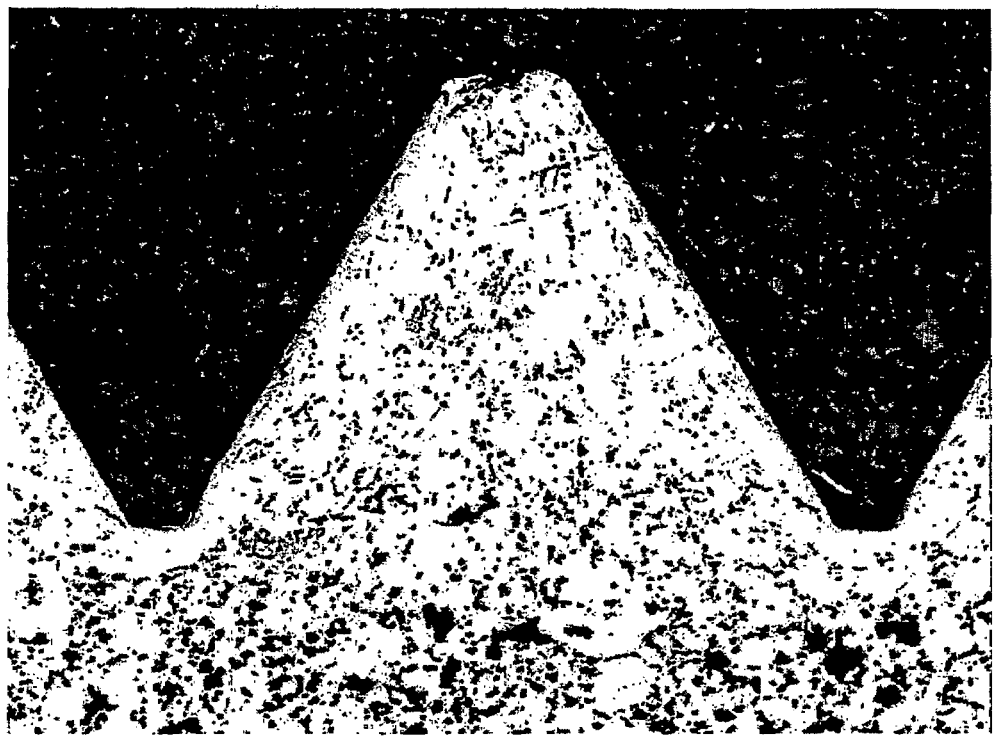
FIG. 12 is a cross-sectional photo-micrograph of a formed thread in a powder metal component, showing densification.
Figure 13:
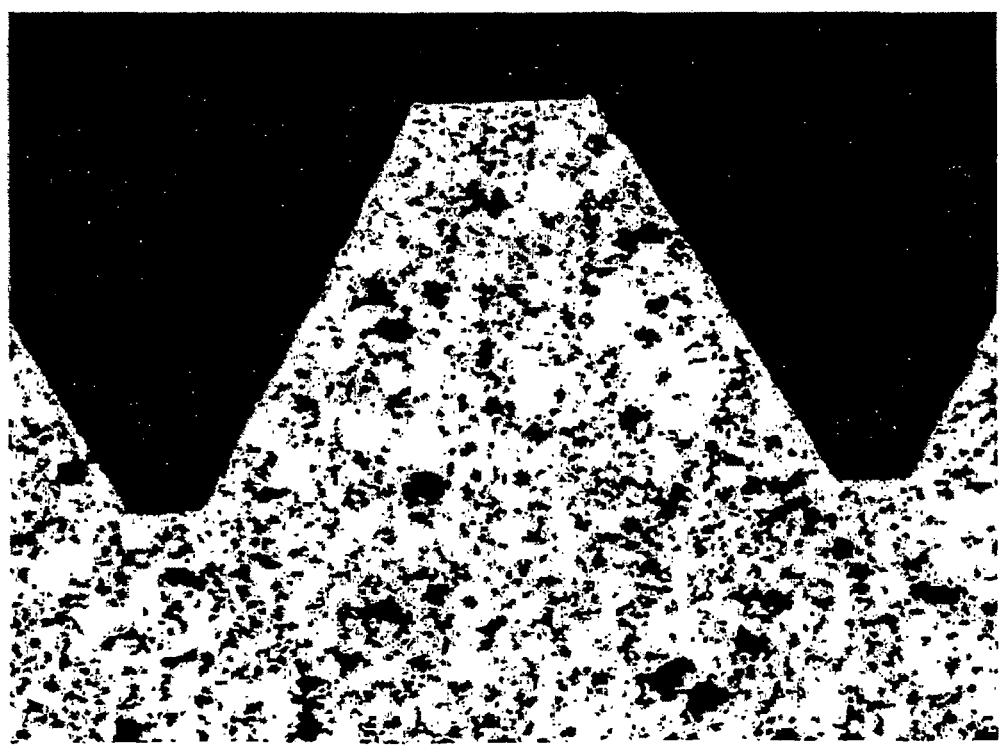
FIG. 13 is a cross-sectional photo-micrograph of cut thread in a powder metal component, showing no densification.
Figure 14:
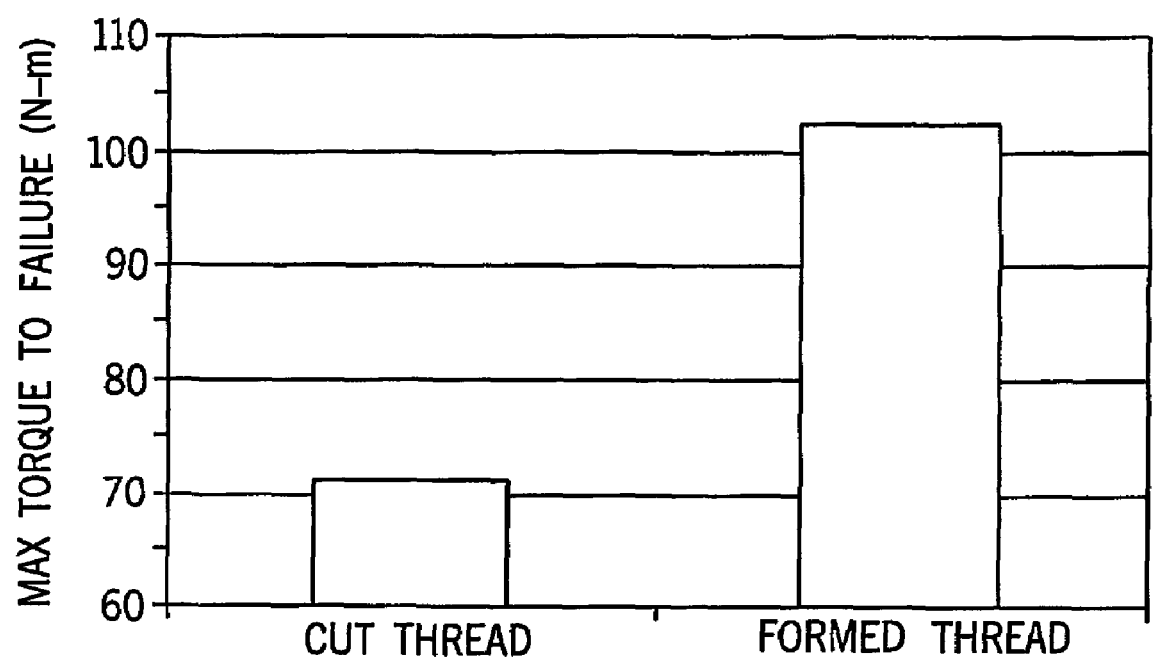
FIG. 14 is a graphical comparison of cut thread strength to formed thread strength in the side bolt holes of a P/M main bearing cap.

FIG. 10 shows an excessively over-burnished bolt-hole B that has suffered from excessive deformation, leading to orange peeling of the surface. The optimum degree of over-burnishing is dependent on the powder metal material ductility and starting density. Simulated engine testing of plain and over-burnished bearing caps resulted in an increase in safety factor from 1.5 to 1.75. This corresponds to a 17% improvement in fatigue resistance.

Combining the 3P and Hole Densification Processes

In one instance, the 3P process eliminated fatigue failure at the bolted surface of a particular over-stressed main bearing cap, but the failure site then moved to the inner bolt hole. When the combination of 3P and bolt hole densification by over-burnishing was used, the result was an even stronger main bearing cap.

Therefore, it is essential to determine the "weakest link" area of the bearing cap under severe cyclic stressing, and to then apply the appropriate treatments, alone or in combination.

Local Densification of Side-Bolt Threads by Enhanced Thread-Forming

Figure 1C:
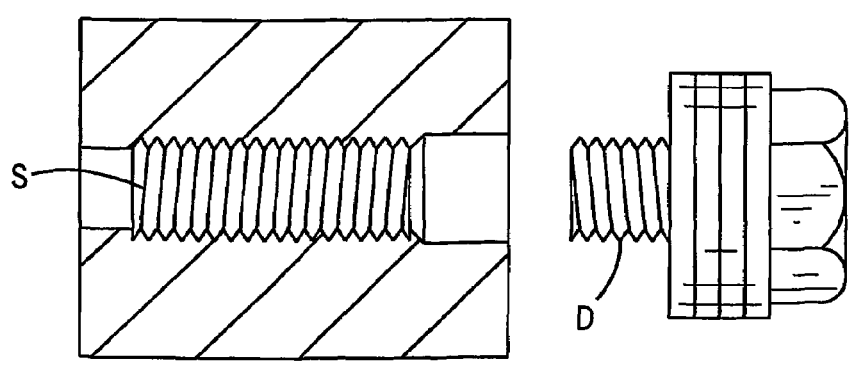
FIG. 1c is a cross-sectional view showing thread failure in one of the side bolt holes S.

In high performance design of main bearing caps, side-bolts D are generally used to stiffen the cylinder block (FIGS. 1c and 8). This stiffening helps strengthen the cap and also reduces undesirable noise known as NVH (noise, vibration, and harshness). These side bolts D draw the side-walls of the engine block inward to form a solid bolted assembly. The stresses on these bolts can be high enough to strip the threads of the P/M steel (FIG. 1c). Thus, the failure mode of these threads is not fatigue, but stripping during the assembly process, and that is the problem addressed by this aspect of the invention.

The conventional way of producing threads in a bolt hole is by thread cutting using a tool called a "tap". An alternative less common method of producing bolt hole threads is by thread forming. This is where the material is deformed into a thread form instead of cutting. In conventional (non P/M) steel, the process has limitations due to very high stresses that are associated with severe deformation of a solid material. It is difficult to achieve a full thread form without risk of tool breakage.

It was discovered that if instead of cutting the threads in the P/M material with a tap, the threads were formed by deformation, a significant degree of thread densification was possible. The natural micro-porosity from the P/M process collapses on itself (FIG. 9) to produce a more dense thread surface. To achieve this condition, it was necessary to go well beyond the normal degree of deformation used in solid materials. In so doing it was found that a fully formed thread was possible without the risk of tool breakage.

Testing showed that the densification achieved from enhanced thread forming significantly increased the resistance of the P/M material to thread failure.

Simulated product testing of main bearing caps with roll formed threads showed a dramatic improvement in thread strength. The chart in FIG. 10 shows the improvement from 71 N-m to 102 N-m, which is a 44% gain in thread strength.

What we claim is:

1. In a powder metal bearing cap which has a bore arch in a bridging section between two legs of said bearing cap, with bolt holes extending through the legs from a bolted face of said bearing cap which is opposite from said bore arch to a joint face of each leg, which is opposite from said bolted face, with one joint face on each side of said arch, the improvement wherein at least a portion of said bolted face is surface densified.

2. The improvement of claim 1, wherein said surface is densified by peening.

3. The improvement of claim 2, wherein said peening is needle peening.

4. The improvement of claim 1, wherein said bolted face is surface densified within a precise area of said bolted face.

5. The improvement of claim 4, wherein said area is surface densified by pattern peening.

6. The improvement of claim 1, wherein said bolted face is not surface densified at bolt head interface areas around the bolt holes.

7. The improvement of claim 1, wherein said bolted face is not surface densified at a margin adjacent to edges of said bolted face.

8. The improvement of claim 1, wherein said bolt holes are surface densified.

9. The improvement of claim 8, wherein said bolt holes are surface densified by compressing the hole surfaces to expand the diameter of the holes.

10. The improvement of claim 1, wherein said bearing cap includes side bolt holes in end surfaces of the bearing cap, and wherein said side bolt holes have formed threads.

11. The improvement of claim 1, wherein said bolt holes are surface densified and said bearing cap includes side bolt holes in end surfaces of the bearing cap, and wherein said side bolt holes have formed threads.

12. The improvement of claim 11, wherein said bolted face is surface densified by patterned peening, said bolt holes are surface densified by compression of the hole surfaces to expand the diameter of the holes.

13. In a powder metal bearing cap which has a bore arch in a bridging section between two legs of said bearing cap, with bolt holes extending through the legs from a bolted face of said bearing cap which is opposite from said bore arch to a joint face of each leg, which is opposite from said bolted face, with one joint face on each side of said arch, the improvement wherein at least one of said bolt holes and at least a portion of said bolted face is surface densified.

* * * * *

UNITED STATES PATENT AND TRADEMARK OFFICE
CERTIFICATE OF CORRECTION

PATENT NO. : 7,168,858 B2
APPLICATION NO. : 10/476317
DATED : January 30, 2007
INVENTOR(S) : Terry M. Cadle et al.

It is certified that error appears in the above-identified patent and that said Letters Patent is hereby corrected as shown below:

Abstract, Line 4:
"bold head" should be
--bolt head--

Column 2, Line 34:
"densities" should be
--densifies--

Column 3, Line 27:
"density" should be
--densify--

Column 6, Line 18:
"lip 0." should be
--lip O.--

Signed and Sealed this

Fifteenth Day of May, 2007

JON W. DUDAS
*Director of the United States Patent and Trademark Office*